(12) United States Patent
Tarachandani et al.

(10) Patent No.: US 9,146,961 B2
(45) Date of Patent: Sep. 29, 2015

(54) TECHNIQUES FOR EFFICIENT QUERIES ON A FILE SYSTEM-LIKE REPOSITORY

(75) Inventors: Asha Tarachandani, Newark, CA (US); Bhushan Khaladkar, Mountain View, CA (US); Sam Idicula, Santa Clara, CA (US); Adiel Yoaz, Tel Aviv (IL); Nipun Agarwal, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1008 days.

(21) Appl. No.: 12/618,356

(22) Filed: Nov. 13, 2009

(65) Prior Publication Data
US 2011/0119283 A1 May 19, 2011

(51) Int. Cl.
G06F 7/00 (2006.01)
G06F 17/30 (2006.01)

(52) U.S. Cl.
CPC .... *G06F 17/30471* (2013.01); *G06F 17/30477* (2013.01)

(58) Field of Classification Search
CPC .................................................. G06F 17/30477
USPC .......................................................... 707/713
See application file for complete search history.

(56) References Cited

U.S. PATENT DOCUMENTS

| 5,542,078 | A | 7/1996 | Martel et al. |
| 5,752,005 | A | 5/1998 | Jones |
| 2002/0083341 | A1* | 6/2002 | Feuerstein et al. ............ 713/201 |
| 2003/0182267 | A1* | 9/2003 | Anderson et al. ................. 707/2 |
| 2005/0055336 | A1* | 3/2005 | Hui et al. .......................... 707/3 |
| 2007/0198545 | A1* | 8/2007 | Ge et al. ........................ 707/100 |
| 2011/0113036 | A1* | 5/2011 | Idicula et al. ................. 707/747 |
| 2012/0150865 | A1 | 6/2012 | Tarachandani et al. |

OTHER PUBLICATIONS

"9 Defining Operators" downloaded from the Internet Jul. 13, 2009 < http://download.oracle.com/docs/cd/B19306_01/appdev.102/b14289 > 10 pages.
"8 Building Domain Indexes" downloaded from the Internet Jul. 13, 2009 < http://download.oracle.com/docs/cd/B19306_01/appdev.102/b14289 > 13 pages.
"7 Using Extensible Indexing" downloaded from the Internet Jul. 1, 2009 < http://download.oracle.com/docs/cd/B28359_01/appdev.111/b28425 > 9 pages.
"25 SQL Access Using Resource_View and Path_View" downloaded from the Internet Jun. 25, 2009 < http://download.oracle.com/docs/cd/B28359_01/appdev.111/b28369 > 20 pages.
IEEE Xplore Digital Library, Search Results, dated Sep. 28, 2014, 1 page.
ACM Digital Library, Publicaitons from ACM and Affliated Organizations, dated Sep. 28, 2014, 4 pages.

* cited by examiner

*Primary Examiner* — Ajith Jacob
(74) *Attorney, Agent, or Firm* — Hickman Palermo Becker Bingham LLP; Ellen Y. Wei

(57) ABSTRACT

Techniques are provided to achieve performance improvements for path-based access to hierarchical data and for utilizing an extensible indexing framework. Extensible operators may be optimized by evaluating the operators using functions native to the database system instead of using functions defined through an extensible indexing mechanism. Furthermore, the database system may resolve a resource path of a query when the query is compiled, and may store the mapping of the resource path to one or more resources in a cursor for the query execution plan to avoid resolving the resource path each time the cursor is used to run the query. The cursor may be made dependent on the one or more resources to which the resource path refers at compile time. This takes advantage of the observation that the mapping of the resource path to particular resources rarely changes between evaluations of a particular query.

16 Claims, 9 Drawing Sheets

FIG. 1

```
select RES from VIEW ╱⎺300
         where equals_path('/home/scott/pol.xml') = 1
               ╲⎽102           ╲⎽104
         and creator = 'scott james'
             ╲⎽106
```

╲⎽100

| RES 302 | ANY_PATH 304 | RESID 306 |
|---|---|---|
| ⋮ | ⋮ | ⋮ |
| <resource><br>  <display_name><br>    po1.xml<br>  </display_name><br>  <creation_date><br>    July 8, 2009<br>  </creation_date><br>  <creator><br>    Scott James<br>  </creator><br>  ...<br>  <content><br>    ...<br>  </content><br></resource> | /HOME/SCOTT/PO1.XML | 005 |
| ⋮ | ⋮ | ⋮ |

FIG. 9

```
select RES from VIEW
                  └─300
       where any_path like '/home/scott/%'
                                    └─902
```
↙ 900

FIG. 10

```
select RES from VIEW
                  └─300
       where under_path(ANY_PATH, '/home/scott/') = 1
                       └─1002              └─1004
```
↙ 1000

TECHNIQUES FOR EFFICIENT QUERIES ON A FILE SYSTEM-LIKE REPOSITORY

CROSS-REFERENCE TO RELATED APPLICATIONS

This application is related to U.S. patent application Ser. No. 08/677,159 entitled EXTENSIBLE INDEXING, filed Jul. 9, 1996, the contents of which are incorporated by reference in their entirety for all purposes as if fully set forth herein.

FIELD OF THE INVENTION

The present invention relates to optimizing the evaluation of queries, and specifically to eliminated overhead associated with resolving resource paths and manipulating data associated with an extensible index.

BACKGROUND

In typical database systems, users store, update, and retrieve information by interacting with user applications ("clients"). The clients respond to the user's interaction by submitting commands to a database application responsible for maintaining the database (a "database server"). The database server responds to the commands by performing the specified operations on the database. To be correctly processed, the commands must comply with the database language that is supported by the database server. Such commands may come in a variety of forms known within the art, including structured query language (SQL) and data definition language (DDL) statements and blocks.

A database system may receive a query on the data managed by a database system. A query optimizer associated with the database system may generate one or more different candidate execution plans for the query, which are evaluated by the query optimizer to determine which execution plan should be used to compute the query.

A query execution plan defines steps for computing a query. An execution plan may be represented by a directed graph of interlinked nodes, referred to herein as operators, that each corresponds to a step or function of the execution plan, referred to herein as an execution plan operation. The hierarchy of the graph (i.e., directed tree) represents the order in which the execution plan operations are performed and how data flows between each of the execution plan operations. An execution plan operator may generate a set of rows as output. There are execution plan operators for performing operations such a table scan, an index scan, sort-merge join, nested-loop join, etc. One type of execution plan operator calls an index routine, defined through an extensible indexing mechanism as described in more detail below, to scan an index.

Query execution plans may be stored in cursor data structures, which allow the execution plans to be quickly executed and to be reused by the database system. For example, a database system may need to perform a particular query one or more times after creating an execution plan for the query. To execute the query, the database system may locate a cursor that the database system created for the execution plan of the query and execute the execution plan using the cursor, instead of compiling a new query execution plan.

When a query includes a reference to a particular resource, herein referred to as a resource path, the resource path may be included in the query execution plan for the query. Traditionally, the resource path is resolved, upon execution of the query execution plan, to determine the appropriate set of resources to which the resource path refers. Thus, a resource path may be resolved each time the database executes a particular query execution plan stored at a particular cursor. Resolving a resource path is computationally expensive because resolving the path requires the database system to perform a lookup to determine the set of resources to which the resource path refers.

Furthermore, various access methods may be used to retrieve data from a database for commands issued to the database system. Many access methods use indices to increase the speed of the data retrieval process. Typical database management systems have built-in support for a few standard types of access methods, such as access methods that use B+ Trees and Hash Tables, that may be used when the key values belong to standard sets of data types, such as numbers, strings, etc. The access methods that are built-in to a database system are referred to herein as native access methods.

A database system may also include a mechanism through which customized indices may be defined, i.e., an extensible indexing mechanism. Indices defined through an extensible indexing mechanism, referred to herein as extensible indexes, may be used to support complex data types that are not easily accessed through native access methods. Thus, extensible indexes may be defined to access complex data types such as text, spatial, image, video, audio, and hierarchically-organized data.

Index routines, also called index functions, are defined for each extensible index to allow the database system to interact with the extensible indices. A database system may assume that all non-native index types will support a certain set of such index routines. For example, one or more index definition methods, index maintenance methods, and index scan methods, etc., may be defined for each extensible index. These routines perform the same functions and may have a similar interface as the built-in routines called by the database server for native access methods. Because the database server knows the names and parameters of the routines that will manage index objects of the non-native index types, the database server can invoke the appropriate index routines in response to commands received from a client.

Index routines of an extensible indexing mechanism may also be defined to support operators that may be used in conjunction with a particular extensible index type, referred to herein as extensible operators. Such operators take advantage of the extensible index to perform operations on the data to which the extensible index corresponds.

Non-limiting examples of index routines, and the definition and use thereof, are given in Oracle® Database Data Cartridge Developer's Guide, 10g Release 2 (10.2) Part Number B14289-02, Chapters 8 and 9, accessed on Jul. 13, 2009, at "docs/cd/B19306_01/appdev.102/b14289/dcidm-nidx.htm" found at the server download.oracle.com, the contents of which are incorporated by reference in their entirety for all purposes as if fully set forth herein.

Such index routines may be defined by clients of a database system using a procedural language, such as PLSQL or C. In contrast, queries on a database system are generally written in a language configured for data access, such as SQL. Thus, it is generally necessary to evaluate a query that includes an index routine using separate evaluation mechanisms for (a) the procedural language of the index routine, and (b) the language in which the rest of the query is defined.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates an example query that includes an extensible operator.

FIGS. 9-10 illustrate example queries that include resource paths.

DETAILED DESCRIPTION

Figures 2, 3:
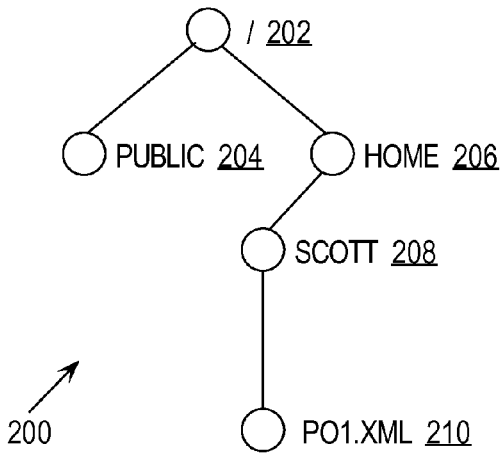
FIG. 2 illustrates a repository including hierarchically organized resources.
FIG. 3 illustrates a view that exposes a hierarchically organized repository to queries.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided to achieve performance improvements for path-based access to hierarchical data and for utilizing an extensible indexing framework. Extensible operators may be optimized by evaluating the operators using functions that are native to the database system instead of using functions defined through an extensible indexing interface. By using native functions to evaluate extensible operators, the database system does not incur the overhead inherent in evaluating functions defined through an extensible indexing mechanism.

Furthermore, a database system may store as much information as possible in compile-time structures for evaluation of the compiled query. For example, the database system may resolve a resource path of a query when the query is compiled and may store the mapping of the resource path to one or more resources in a cursor for the associated query execution plan to avoid resolving the resource path each time the cursor is used to run the execution plan. The cursor may be made dependent on the one or more resources to which the resource path refers at compile time. This takes advantage of the observation that the mapping of the resource path to particular resources rarely changes between evaluations of a particular query.

Extensible Indexing Operators

Extensible operators may be optimized by evaluating the operators using functions native to the database system instead of using functions defined using an extensible indexing mechanism. In one embodiment of the invention, a native function is a function that is part of the kernel of a database system. In this embodiment, a native function may be compiled as part of database server software of a database system. Database server software is the software product furnished by vendors of database systems, such as Oracle, Inc. The kernel of a database system includes the managing software of the database system. A kernel may manage low-level aspects of the database system, such as execution of applications, memory management, input and output (I/O), etc.

Evaluating a query including an extensible operator traditionally requires separate evaluation mechanisms for (a) the procedural language of an index routine defined through an extensible indexing mechanism, and (b) the language in which the rest of the query is defined. In contrast, by using native functions to evaluate extensible operators, the database system does not incur the overhead of evaluating an index routine defined through an extensible indexing mechanism.

Also by using native functions for extensible operator evaluation, parameters and return values need not be passed between evaluation mechanisms for the disparate languages, which obviates the need to convert the parameters and return values into intermediate types. Because there is no change in the internal representation of the parameter values and return values, there is no need to marshal and unmarshal these values, using generic representation mechanisms, to pass the values between multiple language evaluation mechanisms.

An example extensible index is used herein to illustrate certain embodiments of the invention. An extensible index may be configured to index any number of data types. One example of an extensible index is an index configured for hierarchical data, referred to as a hierarchical index for purposes of illustration. Such a hierarchical index may allow a database system to quickly evaluate queries involving resource paths in hierarchical data.

Queries that involve hierarchical data associated with a hierarchical index may include extensible operators that utilize the hierarchical index. For example, the operator under_path may be defined to return paths under a particular resource path that is indexed by the hierarchical index. The operator equals_path may be configured to find the resource referred to by the particular resource path. An implementation of under_path and equals_path is described in the Oracle XML DB Developer's Guide, 10g Release 2, Part Number B14259-02, Chapter 22, accessed on Jul. 9, 2009, at "docs/cd/B19306_01/appdev.102/b14259/xdb18res.htm#sthref2107" found at the server download.oracle.com, the contents of which are incorporated by reference in its entirety for all purposes as if fully set forth herein. In one embodiment of the invention, under_path and equals_path are not defined by a client, but are internally defined by the database system.

Because under_path and equals_path are defined using an extensible indexing mechanism, these operators can interact with indexes defined using the extensible indexing mechanism while native operators may not. Thus, inclusion of one or more of such extensible operators in a particular query allows the database system to use a corresponding extensible index in the query execution plan for the particular query. For example, equals_path 102 is included in query 100 of FIG. 1.

A repository of hierarchical data within a database system may be exposed to queries in any number of ways. For example, the Oracle XML DB exposes hierarchical XML data using predefined public views, called RESOURCE_VIEW and PATH_VIEW, described in more detail in the Oracle XML DB Developer's Guide, 10g Release 2 (10.2) Part Number B14259-02, Chapter 22, referenced above. These public views provide a mechanism for using SQL to access hierarchical data stored in a repository. For purposes of illustration, query 100 selects resources from view 300 (shown in more detail in FIG. 3), which exposes hierarchical data to queries in a manner that is similar to RESOURCE_VIEW described above.

FIG. 2 illustrates an example repository 200, which is exposed to queries by view 300 of FIG. 3. Repository 200 includes root folder 202, public folder 204, home folder 206, scott folder 208, and xml file 210. View 300 includes RES column 302, ANY_PATH column 304, and RESID column 306. View 300 further includes a row for each resource in repository 200, including row 310 representing xml file 210. Both files and folders are considered resources, and may be represented in view 300.

RES column 302 includes information, represented as xml data, for the properties and content of each resource row. For example, the value in RES column 302 at row 310, representing xml file 210, includes (a) attributes of xml file 210, such as display name, creation date, and creator, etc., and (b) the content of xml file 210, i.e., within the "content" tag. The information included for the resource in such a RES column may have any number of configurations within the embodiments of the invention. ANY_PATH column 304 includes a possible path for each resource row. For example, the value in ANY_PATH column 304 for xml file 210 is "/home/scott/po1.xml". The RESID column 306 includes a unique identifier for each resource row, which, for xml file 210, is "005".

Queries may be made on several information types represented in view 300. For example, queries may be made by resource path, by path fragment, or by properties of a resource, such as display name, creation date, creator, etc. Queries that involve a resource path, such as query 100 of FIG. 1, may be optimized using a hierarchical index that indexes the data in repository 200. Thus, equals_path 102 is included in query 100 to enable evaluation of the query using, at least in part, a hierarchical index associated with repository 200 (FIG. 2).

Creating a Query Execution Plan

Upon compilation of query 100 of FIG. 1, the database system recognizes equals_path 102 to be an extensible operator. As previously indicated, an extensible operator such as equals_path is traditionally defined through an extensible indexing mechanism using index routines. The index routines of an extensible indexing mechanism are traditionally defined in a procedural language, such as PLSQL or C, etc. References to such index routines in a query execution plan generally include a function name, library name, and language, etc. for each index routine used in the execution plan, which allows proper location and interpretation of the index routines by the database system. In one embodiment of the invention, the extensible indexing mechanism interprets the index routines that are referred to in a query execution plan.

Therefore, a query evaluation plan for query 100 includes information required by the database system to evaluate equals_path 102. For example the evaluation plan may include a function name, library name, and language, etc., for each index routine required for equals_path 102. Also, resource path 104 may be included in the query execution plan for query 100 to be resolved according to certain embodiments of the invention, described in more detail below.

Defining Hybrid Operators

In one embodiment of the invention, the database system makes native functions available for evaluating an extensible operator. For example, a reference to a native function for evaluating an extensible operator, such as equals_path 102, may be included in the query execution plan for query 100. The reference to the native function may be instead of or in addition to a function name, library name, and language, etc. for an extensible indexing routine to evaluate the extensible operator. Thus, when the extensible operator is evaluated, the native function referred to in the query execution plan may be used to evaluate the operator instead of using the extensible index routine.

However, under certain circumstances, the native function may be inappropriate to perform the evaluation of the extensible operator. The natively-defined operator would be inappropriate when there are language-specific semantics that need to be implemented. For example, type conversions of complex-typed parameters and/or return values, which complex data types are typically user-defined, cannot be done by the natively-defined operator. Under these circumstances, the extensible indexing routine, for which a function name, library name, and language, etc. is included in the query execution plan for query 100, may be used to perform the evaluation of the extensible operator.

Figure 4:
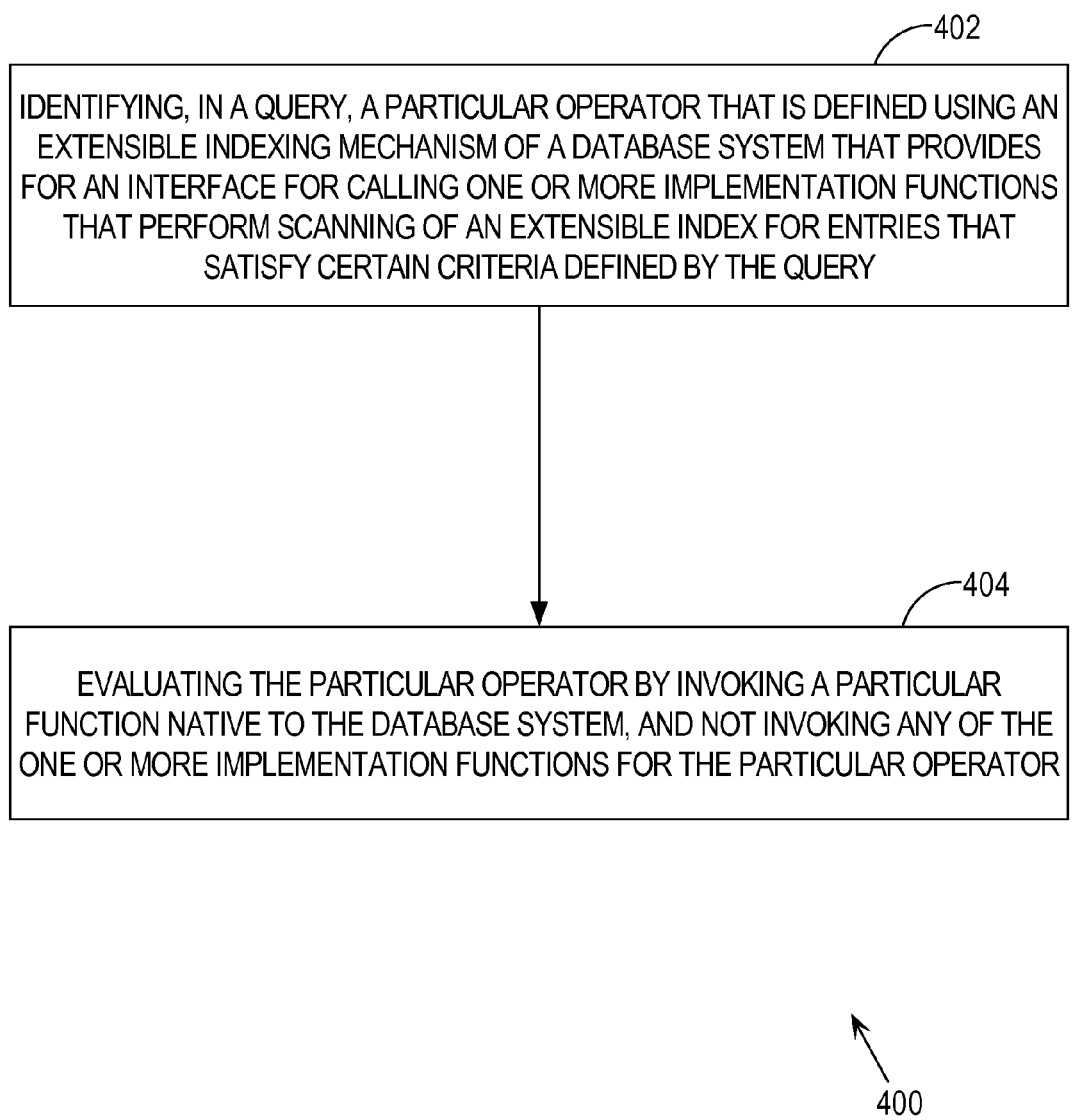
FIG. 4 illustrates an example method of evaluating an operator that is defined through an extensible indexing mechanism of a database system by invoking a function that is native to the database system.

FIG. 4 illustrates an example method 400 for evaluating an operator that is defined through an extensible indexing mechanism of a database system by invoking a function that is native to the database system.

At step 402, a particular operator that is defined using an extensible indexing mechanism of a database system is identified in a query. The extensible indexing mechanism provides for an interface for calling one or more implementation functions that perform scanning of an extensible index for entries that satisfy certain criteria defined by the query. For example, a database system identifies equals_path 102 of query 100 (FIG. 1) as being an operator, supported by a hierarchical extensible index, that is defined using an extensible indexing mechanism. In this example, the extensible indexing mechanism provides index routines, also referred to as implementation functions, to perform the scanning of the hierarchical extensible index.

At step 404, the particular operator is evaluated by invoking a particular function native to the database system, and not invoking any of the one or more implementation functions for the particular operator. For example, when a database system runs a query execution plan for query 100, the database system evaluates equals_path 102 using a function that is native to the database system instead of one or more index routines defined through the extensible indexing mechanism. Thus, if a query execution plan for query 100 includes both references to index routines and references to native functions, one or more of the native functions is used to evaluate the query execution plan, at least in part.

Because the native functions are compiled and located in the kernel of the database system, running such a native function does not require compilation of the function as would running an index routine defined through an extensible indexing mechanism. In one embodiment of the invention, a database system only invokes a native function if the associated extensible operator is internally implemented by the database system, and is not user-defined.

While native functions may be used to implement certain extensible operators within certain embodiments of the invention, index routines are still used for one or more aspects of the extensible operators and corresponding extensible indices. For example, to compile a particular query that involves an extensible index, e.g., query 100, the query compiler for the database system makes decisions based on the selectivity and cost of certain aspects of the extensible index. Information on the selectivity and cost of aspects of an extensible index may be obtained through selectivity and cost index routines defined through an extensible indexing mechanism. Furthermore, the initial creation of the extensible index is done using index routines defined through an extensible indexing mechanism.

Paths in Compiled Query Execution Plans

Furthermore, when a query is compiled by a database system, information for the query may be included in the cursor for the query. In one embodiment of the invention, the cursor is a data structure generated by compiling the query, and is used to execute the query. The data structure of a cursor may include information such as an execution plan for the query, as well as other information used in executing the query, including resource path information for the query.

As previously indicated, resource paths that are included in a query are generally resolved each time the query is executed because paths to resources may change between executions of the query. Resolving a resource path each time a query executes causes inefficiencies because the occurrence of a path to a resource changing between executions of a particular query is rare.

Storing Resolution of Paths Within the Query Cursors

Figure 5:
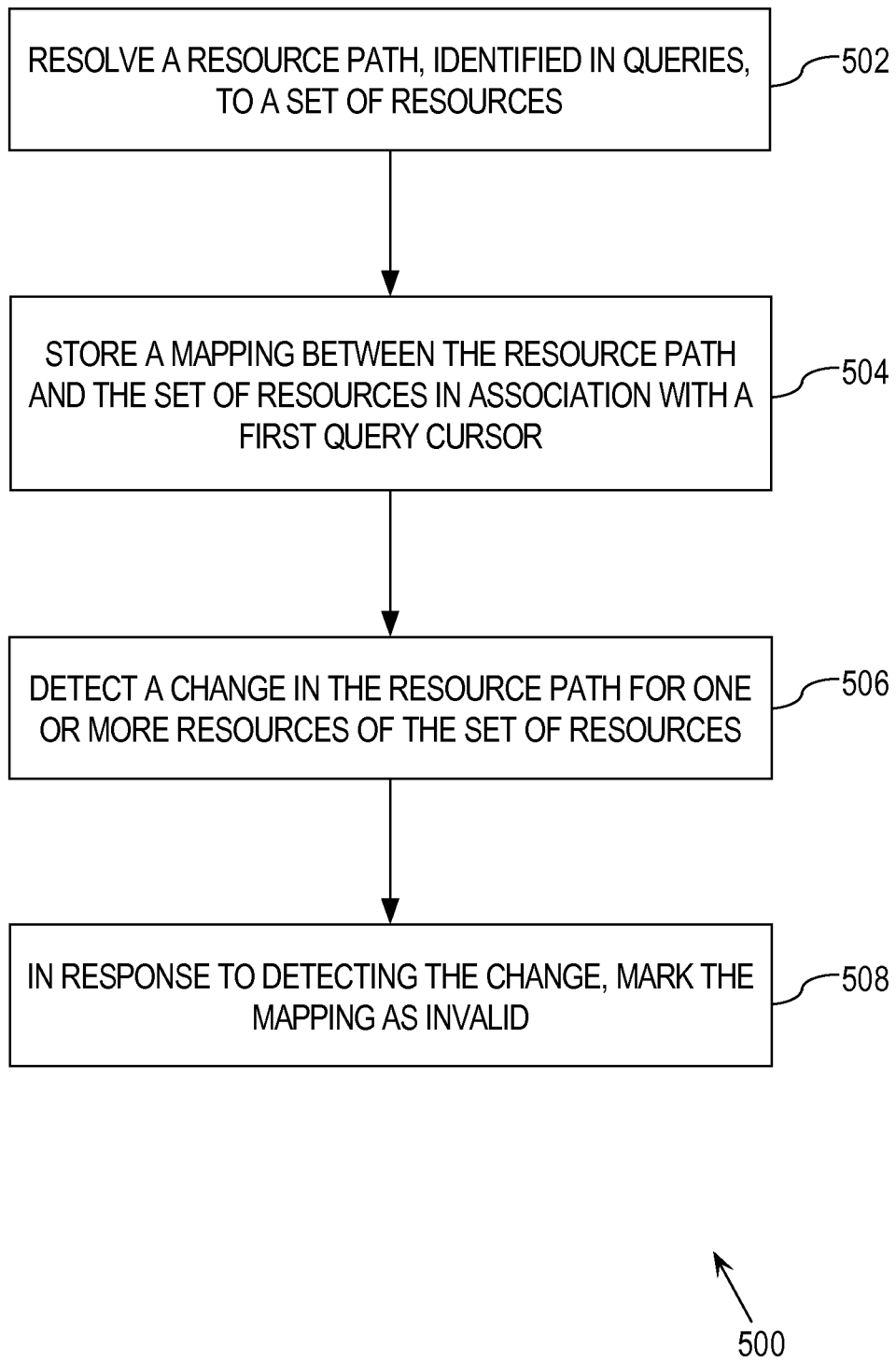
FIG. 5 illustrates an example method of resolving a resource path at compile time and creating a dependency between the cursor and one or more resources

To take advantage of the fact that the path to a particular resource rarely changes, one embodiment of the invention resolves a resource path in a query when the query is compiled and stores the resolution of the resource path in the cursor for the query. In this embodiment, the database system makes the cursor dependent on the one or more resources to which the resource path resolves. Thus, if the path to one or more of the resources changes after compilation of the query, the database system is alerted that the cursor is out of date. FIG. 5 illustrates an example method 500 of resolving a resource path at compile time and creating a dependency between the cursor and the one or more resources.

At step 502, a resource path, identified in queries, is resolved to a set of resources. For example, a database system compiles query 100 of FIG. 1, and creates a cursor to contain the resulting execution plan, also referred to as query execution plan, for query 100. Upon compilation of query 100, resource path 104 is resolved to a set of one or more resources to which resource path 104 refers. As illustrated in repository 200 of FIG. 2, resource path 104, "/home/scott/po1.xml", resolves to xml file 210.

In one embodiment of the invention, a resource path is resolved by retrieving a unique resource identifier for each resource to which the resource path corresponds. In this embodiment, the unique RESID for xml file 210 is retrieved from view 300, i.e., "005".

At step 504, a mapping between the resource and the set of resources is stored in association with a first query cursor. For example, the database system stores the RESID for xml file 210 in the cursor created for query 100. Thus, in this embodiment of the invention, a cursor data structure not only contains information for the execution plan of a query, but also may include one or more mappings between resource paths and resources to which the resource paths resolve.

At step 506, a change in the resource path for one or more resources of the set of resources is detected. For example, the database system may make the cursor for query 100 dependent on xml file 210. Through this dependency, the database system detects changes in the path for xml file 210, and knows that these changes are relevant to the cursor for query 100.

Figure 6:
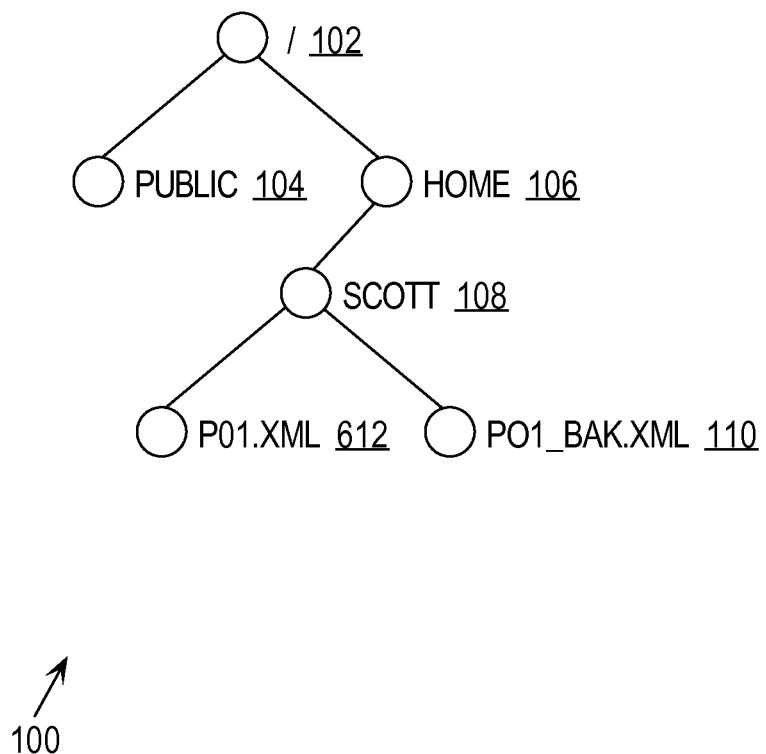
FIG. 6 illustrates a repository including hierarchically organized resources.

For example, FIG. 6 illustrates database repository 200 in which the path for xml file 210 has changed, i.e., xml file 210 has been renamed from "po1.xml" to "po1_bak.xml". A new xml file 612 named "po1.xml" has been added to repository 200 under the path "/home/scott/". Thus, resource path 104 of query 100 (FIG. 1) now resolves to xml file 612 instead of to xml file 210. The dependency created in the database system causes the database system to detect this change in the resource path for xml file 210. Creation, maintenance, and use of dependencies is well-known in the art.

Figure 7:
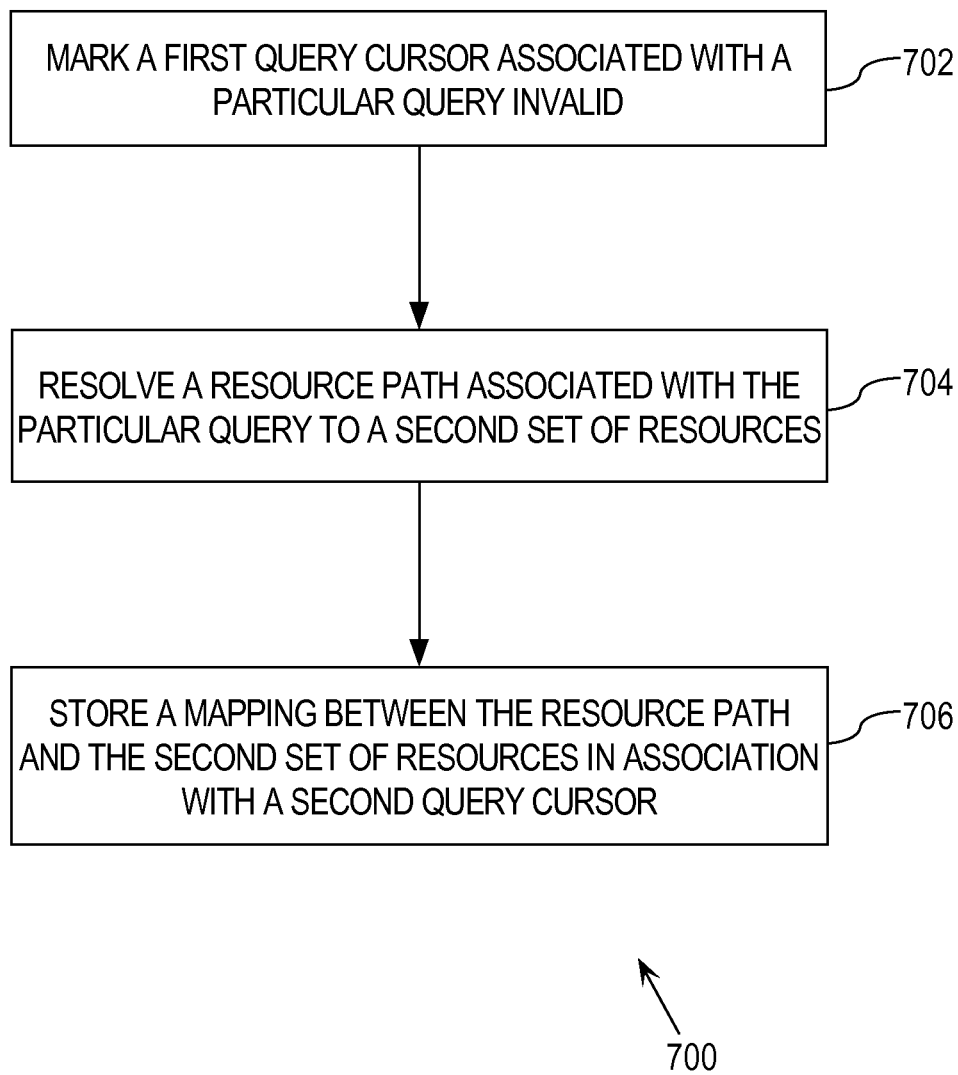
FIG. 7 illustrates an example method for recompiling the query execution plan of a cursor after marking the cursor as invalid.

At step 508, the mapping is marked as invalid in response to detecting the change. In one embodiment of the invention, the mapping is marked as invalid by marking the cursor associated with the mapping as invalid. When a cursor is marked as invalid, the query execution plan associated with the cursor cannot be executed again before the query execution plan is recompiled. FIG. 7 illustrates method 700 for recompiling the query execution plan of a cursor after marking the cursor as invalid.

At step 702, a first query cursor associated with a particular query is marked as invalid. For example, the query cursor for query 100 is marked as invalid, i.e., in response to detecting the change in resource path 104 as described above.

At step 704, a resource path associated with the particular query is resolved to a second set of resources. For example, the execution of query 100 is requested after the query cursor for query 100 is marked as invalid. Because the cursor for query 100 is marked as invalid, the query execution plan for query 100 is recompiled before query 100 can be executed. In association with compiling a new query execution plan for query 100, resource path 104 in query 100 is resolved to a second set of resources to which resource path 104 refers. FIG. 6 illustrates that "/home/scott/po1.xml" no longer maps to xml file 210, but maps to xml file 612. Therefore, the database system determines that resource path 104 refers to xml file 612.

At step 706, a mapping between the resource path and the second set of resources is stored in association with a second query cursor. For example, a unique identifier for xml file 612 may be stored in association with the query cursor for the recompiled query execution plan for query 100.

Figure 8:
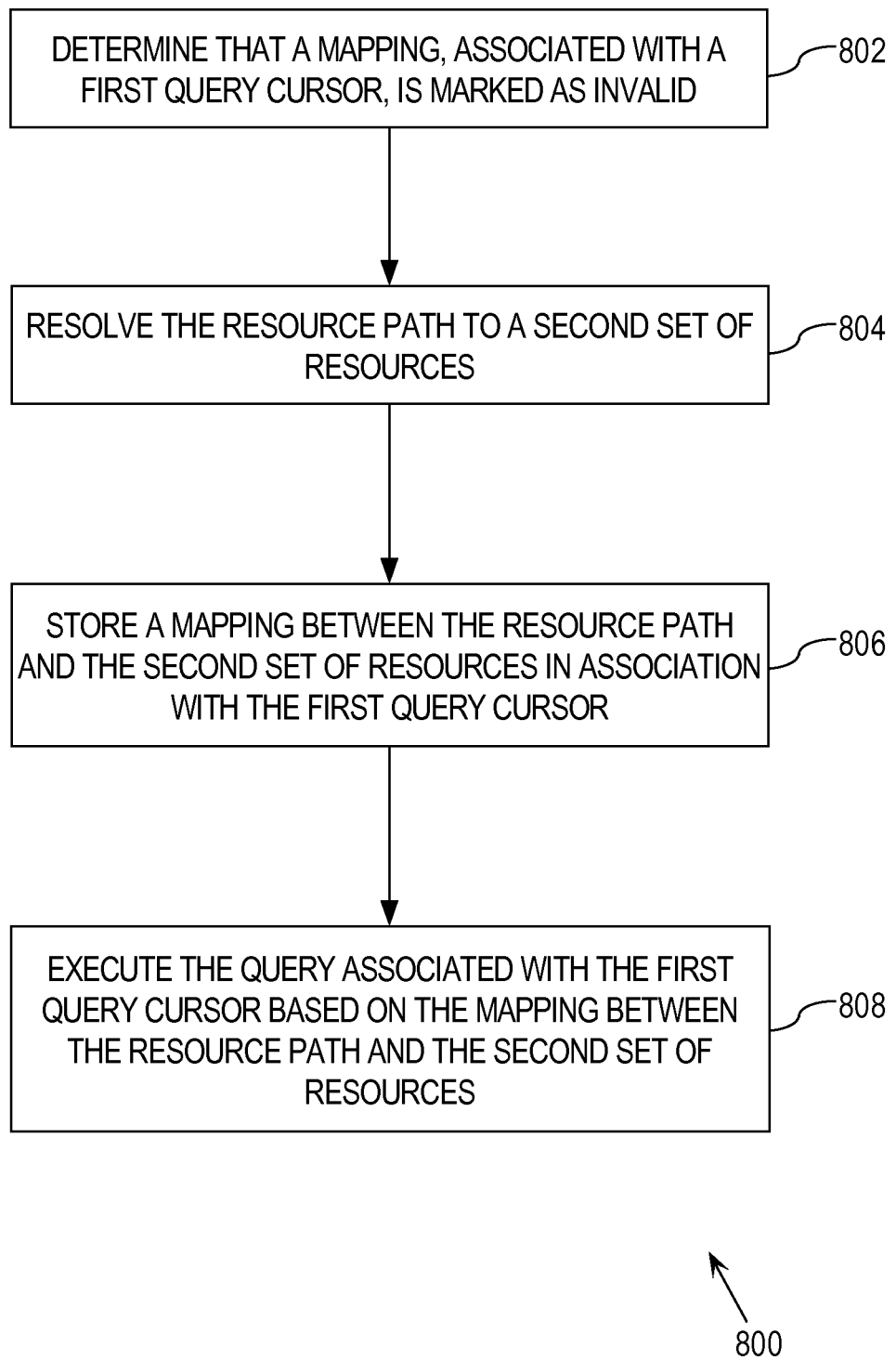
FIG. 8 illustrates an example method for resolving a mapping that is marked invalid and executing the associated query based on the new resolution.

In another embodiment of the invention, at step 508 of FIG. 5, the mapping itself is marked invalid in response to detecting the change, and the cursor is not marked as invalid. Thus, the query execution plan associated with the invalidated mapping cannot be executed until the resource path associated with the invalidated mapping is newly resolved. FIG. 8 illustrates method 800 for resolving a mapping that is marked invalid and executing the associated query based on the new resolution.

At step 802, a mapping, associated with a first query cursor, is determined to be marked as invalid. For example, a database server determines that the mapping associated with resource path 104 stored in the query cursor for query 100 has been marked as invalid. The database server may make such a determination in response to a request to execute query 100 after the mapping is marked as invalid. In one embodiment of the invention, the database server determines that the mapping stored in association with the first query cursor cannot be used for a second query based, at least in part, on determining that the mapping is marked as invalid.

At step 804, the resource path is resolved to a second set of resources. For example, as described in connection with method 700, the database server determines that resource path 104 refers to xml file 612 instead of xml file 210.

At step 806, a mapping between the resource path and the second set of resources is stored in association with the first query cursor. For example, a unique identifier for xml file 612 is stored in association with the cursor for the previously-compiled query execution plan for query 100, without recompiling the query execution plan or creating a new cursor.

At step 808, the query associated with the first query cursor is executed based on the mapping between the resource path and the second set of resources. For example, query 100 is executed using the previously-compiled query execution plan based on the mapping between resource path 104 and xml file 612.

Alternative Embodiments

Any resource path included in a query may be resolved according to method 500. For example, paths may be used in SQL expressions that include the well-known SQL operator, LIKE. The operator LIKE is used to compare values in a database to a designated pattern. For example, query 900 of FIG. 9 selects rows in view 300 where ANY_PATH column 304 contains a path like "/home/scott/%" 902.

In SQL, the percent sign ('%') may be used in LIKE expressions as a wildcard. Because wildcards may be used to represent any portion of a path, only a special case of paths included in LIKE expressions may be resolved at compile time. If the pattern for the path ends in a folder, such as "/home/scott/%", then a database server may treat the pattern as the definition of a subtree and resolve the pattern to each resource corresponding to the subtree. However, if a particular query selects paths LIKE "%home%", then any path with the characters 'home' anywhere in the path would satisfy the predicate. This kind of pattern does not define a subtree sufficiently enough to resolve the paths that satisfy the predicate.

In one embodiment of the invention, the optimization of resolving a path in a query at compile time and storing a mapping for the resolution in a cursor for the query is tied to the functionality of an extensible path operator. An extensible path operator is an extensible operator that uses a hierarchical index to deal with resource paths of hierarchical data.

In this embodiment of the invention, a database server recognizes a resolvable path in a query, i.e., that is part of a SQL LIKE expression such as path 902 of query 900. Upon compilation of the query, the database server replaces the LIKE predicate, i.e., as in query 900, with an extensible path operator that implements the optimization of resolving a resource path at compile time.

FIG. 10 illustrates a query 1000 in which the LIKE predicate of query 900 is replaced by a predicate including extensible path operator 1002, "under_path". By replacing the LIKE predicate with an extensible path operator 1002, query 1000 may be evaluated using an extensible index associated with extensible path operator 1002, such as a hierarchical index, and may include the optimization of resolving path 1004 at compile time, which, according to one embodiment of the invention, is included in the definition of the extensible path operator.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
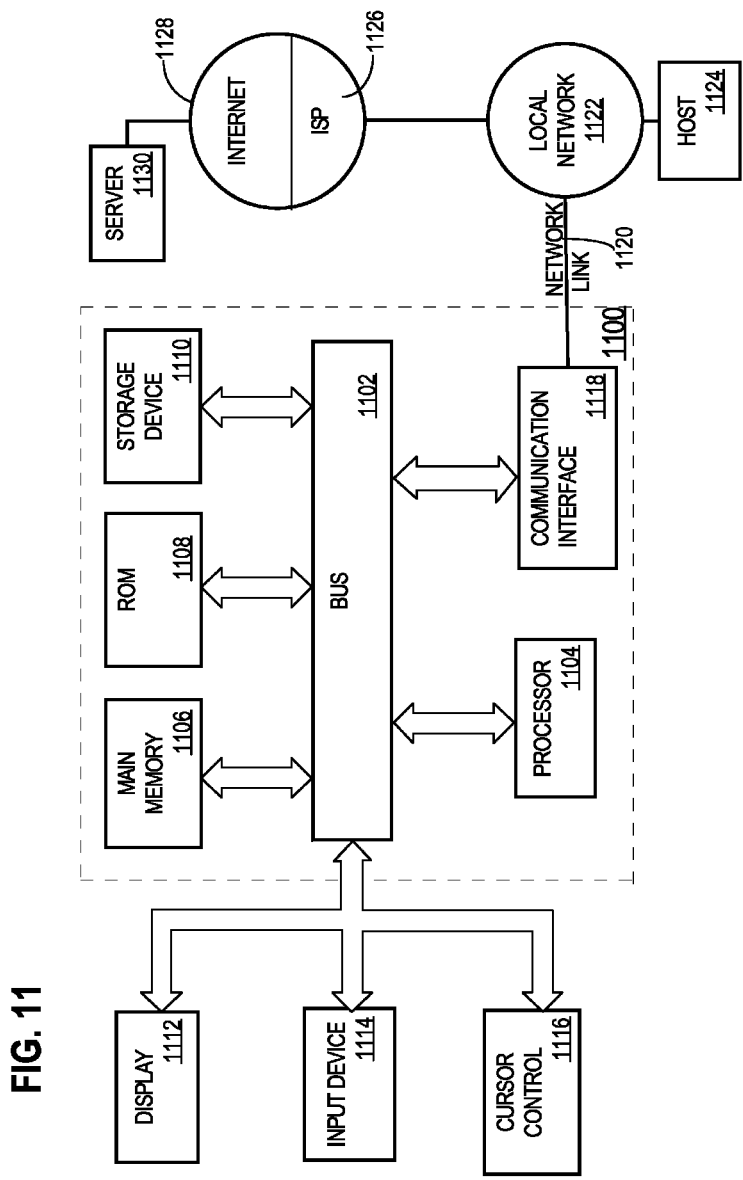
FIG. 11 is a block diagram of a computer system on which embodiments of the invention may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine.

According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    initially resolving a resource path, identified in a query directed to data in a database system, to a file;
    compiling a query execution plan for the query;
    storing, in association with the query execution plan, a first mapping between the resource path and the file;
    detecting a change in the resource path for the file;
    performing a subsequent resolution in response to detecting the change in the resource path;
    after performing the subsequent resolution, storing, in association with the query execution plan, a second mapping based on the subsequent resolution, wherein the second mapping replaces the first mapping; and
    before detecting the change in the resource path for the file, executing the query using the query execution plan and the first mapping;
    after detecting the change in the resource path for the file, executing the query using the query execution plan and the second mapping;
    wherein the method is performed by one or more computing devices.

2. The method of claim 1, further comprising:
    in response to detecting the change in the resource path, marking the first mapping as invalid;
    wherein the query execution plan cannot be executed after the first mapping is marked as invalid until after performing the subsequent resolution.

3. The method of claim 1, wherein the change detected comprises a change to the resource path.

4. The method of claim 1,
wherein the change detected comprises a change to the file;
wherein performing the subsequent resolution comprises resolving the resource path to a different file.

5. The method of claim 1, further comprising:
prior to initially resolving the resource path:
determining that a particular predicate associated with the resource path in the query does not involve an operator defined using an extensible indexing mechanism; and
including, in the particular predicate, an extensible operator defined using the extensible indexing mechanism;
wherein initially resolving the resource path and performing the subsequent resolution are performed using implementation functions for the extensible operator.

6. A computer-readable storage medium storing one or more sequences of instructions which, when executed by one or more processors, cause:
initially resolving a resource path, identified in one or more queries directed to data in a database system, to a file;
compiling a query execution plan for the query;
storing, in association with the query execution plan, a first mapping between the resource path and the file;
detecting a change in the resource path for the file;
performing a subsequent resolution in response to detecting the change in the resource path;
after performing the subsequent resolution, storing, in association with the query execution plan, a second mapping based on the subsequent resolution, wherein the second mapping replaces the first mapping;
before detecting the change in the resource path for the file, executing the query using the query execution plan and the first mapping;
after detecting the change in the resource path for the file, executing the query using the query execution plan and the second mapping.

7. The computer-readable storage medium of claim 6, wherein the one or more sequences of instructions include instructions which, when executed by the one or more processors, cause:
in response to detecting the change in the resource path, marking the first mapping as invalid;
wherein the query execution plan cannot be executed after the first mapping is marked as invalid until after performing the subsequent resolution.

8. The computer-readable storage medium of claim 6, wherein the change detected comprises a change to the resource path.

9. The computer-readable storage medium of claim 6,
wherein the change detected comprises a change to the file;
wherein performing the subsequent resolution comprises resolving the resource path to a different file.

10. The computer-readable storage medium of claim 6, wherein the one or more sequences of instructions include instructions which, when executed by the one or more processors, cause:
prior to initially resolving the resource path:
determining that a particular predicate associated with the resource path in the query does not involve an operator defined using an extensible indexing mechanism; and
including, in the particular predicate, an extensible operator defined using the extensible indexing mechanism;
wherein initially resolving the resource path and performing the subsequent resolution are performed using implementation functions for the extensible operator.

11. The method of claim 1,
wherein the query execution plan is associated with a query cursor;
wherein storing the first mapping in association with the query execution plan comprises associating the first mapping with the query cursor of the query execution plan; and
wherein storing the second mapping in association with the query execution plan comprises associating the second mapping with the query cursor of the query execution plan.

12. The method of claim 11, further comprising:
in response to detecting the change in the resource path, marking the query cursor as invalid, wherein the query execution plan associated with the query cursor cannot be executed while the query cursor is marked as invalid; and
after performing the subsequent resolving and recompiling the query execution plan, marking the query cursor as valid.

13. The method of claim 1, further comprising recompiling the query execution plan after performing the subsequent resolving.

14. The computer-readable storage medium of claim 6,
wherein the query execution plan is associated with a query cursor;
wherein storing the first mapping in association with the query execution plan comprises associating the first mapping with the query cursor of the query execution plan; and
wherein storing the second mapping in association with the query execution plan comprises associating the second mapping with the query cursor of the query execution plan.

15. The computer-readable storage medium of claim 14, wherein the one or more sequences of instructions include instructions which, when executed by the one or more processors, cause:
in response to detecting the change in the resource path, marking the query cursor as invalid, wherein the query execution plan associated with the query cursor cannot be executed while the query cursor is marked as invalid; and
after performing the subsequent resolving and recompiling the query execution plan, marking the query cursor as valid.

16. The computer-readable storage medium of claim 6, wherein the one or more sequences of instructions include instructions which, when executed by the one or more processors, cause recompiling the query execution after performing the subsequent resolving.

* * * * *

UNITED STATES PATENT AND TRADEMARK OFFICE
CERTIFICATE OF CORRECTION

PATENT NO. : 9,146,961 B2  
APPLICATION NO. : 12/618356  
DATED : September 29, 2015  
INVENTOR(S) : Tarachandani et al.

Page 1 of 1

It is certified that error appears in the above-identified patent and that said Letters Patent is hereby corrected as shown below:

On the title page item [56], column 2, line 15, delete "Publicaitons" and insert -- Publications --, therefor.

On the title page item [56], column 2, line 15, delete "Affliated" and insert -- Affiliated --, therefor.

In the specification

Column 3, line 22, delete "resources" and insert -- resources. --, therefor.

Signed and Sealed this  
Thirty-first Day of May, 2016

Michelle K. Lee  
*Director of the United States Patent and Trademark Office*